United States Patent [19]

Cunningham et al.

[11] 4,046,688

[45] Sept. 6, 1977

[54] REMOVAL OF ANTIMONY FROM INDUSTRIAL STREAMS

[75] Inventors: Virginia L. Cunningham, Hatboro; James S. Clovis, Morrisville; Marvin J. Hurwitz, Elkins Park, all of Pa.

[73] Assignee: Rohm and Haas Company, Philadelphia, Pa.

[21] Appl. No.: 624,359

[22] Filed: Oct. 21, 1975

[51] Int. Cl.$^2$ .............................................. C02B 1/56
[52] U.S. Cl. .................................. 210/37 R; 423/617
[58] Field of Search ............ 75/69, 101 BE; 423/617, 423/87, 24, 87; 210/38 B, 37 R, 37 A

[56] References Cited

U.S. PATENT DOCUMENTS

| | | | |
|---|---|---|---|
| 2,653,089 | 9/1953 | Brooke | 210/38 B |
| 2,873,170 | 2/1959 | Hyde et al. | 423/87 X |
| 3,658,470 | 4/1972 | Zievers et al. | 210/37 B X |
| 3,920,545 | 11/1975 | Argabright et al. | 210/38 B X |

*Primary Examiner*—Frank A. Spear, Jr.
*Assistant Examiner*—E. Rollins Cross
*Attorney, Agent, or Firm*—Louis F. Kline, Jr.

[57] ABSTRACT

A novel process is described for the removal and/or recovery of dissolved antimony from an industrial stream, such as a waste stream, using a strong acid and-/or a strong base ion exchange resin, in the hydrogen and hydroxyl forms respectively, to adsorb the antimony.

11 Claims, No Drawings

REMOVAL OF ANTIMONY FROM INDUSTRIAL STREAMS

The present invention relates to a process for removing dissolved antimony from an industrial stream. In a preferred embodiment the invention is directed to recovering antimony for reuse from a stream containing the same in minor amounts.

Antimony is a highly toxic but nevertheless valuable metal used in a variety of processes in industrial, particularly chemical, applications. In such applications the antimony is commonly utilized as a catalyst added in the form of antimony trioxide, antimony tartrate, antimony oxalate and antimony thiocarboxylate, to name but a few. Antimony compounds are also used as catalysts in the manufacture of organic fluorine compounds and as mordants in the textile and leather industries. As a by-product of the acid leaching of ores, antimony can also create industrial pollution problems of considerable importance. For these and other reasons efforts to remove or recover antimony from process or waste streams have been made in the past.

A known method of removing and/or recovering antimony consists of incinerating a concentrated waste stream containing the antimony followed by (1) water-scrubbing, (2) bag filtration, or (3) electrostatic precipitation of the gases to remove the antimony trioxide. The current expense of fuel oil makes this somewhat effective method rather uneconomical, especially in view of the subsequent steps required to remove antimony from the combustion gases. The antimony is present in the combustion gases as very small particles of antimony trioxide. These may form an aerosol making bag-filtration impractical and water-scrubbing insufficiently effective. Electrostatic precipitation, while an effective method of antimony collection, is quite expensive, with high investment and operating costs.

Antimony compounds are used extensively as catalysts in polyester production which produces an effluent containing both antimony and a crude organic mixture. Recovery of antimony from such effluent mixtures is particularly difficult by precipitation techniques because of the co-precipitation of organic materials (since such precipitate cannot be disposed of easily). As illustrative of processes using antimony compounds as catalysts, reference is made to: U.S. Pat. No. 3,609,016 issued Sept. 28, 1971 (antimony octanoate); Japanese Pat. No. 2,121,186, issued Nov. 11, 1971 (antimony tartrate); U.S. Pat. No. 3,624,040 issued Nov. 30, 1971 (pyridylethylene antimony); Japanese Pat. No. 71 41033 issued Dec. 3, 1971 (antimonite magnesium); Japanese Pat. No. 72 06423 issued Feb. 23, 1972 (antimony trialkyl); and Czech Pat. No. 141,488 issued May 15, 1971 (antimony acetate).

In the present-day manufacture of poly(ethylene terephthalate) the reaction effluent is normally a crude acidic glycol stream containing antimony. Due to economic considerations, this effluent is rectified for glycol recovery, producing a residue which may or may not be further treated for raw material recovery. In either case, the final residue presents a serious disposal problem because of the presence of toxic antimony. Other chemical processes having different diol effluent streams containing antimony, such as butane diol, propane diol, hexane diol, etc., are known in the art, e.g., see British Pat. No. 1,246,448, Sept. 15, 1971 and German Pat. No. 2,054,903, May 10, 1972.

Aqueous effluents from ore processing, e.g., sulfite ores, also contain large amounts of antimony which, if not recovered, create a pollution problem of serious proportions.

We have now discovered that antimony can be removed efficiently and, by a preferred embodiment of the invention, entirely from a crude industrial stream by means of ion exchange utilizing one or more ion exchange resins in specific form or forms. In particular, we have found that a strong acid cation exchange resin in the hydrogen form is highly effective for removing antimony from an acidic solution thereof, while a strong base anion exchange resin in the hydroxyl form is highly effective for removing antimony from a less acidic or basic solution thereof. The preferred ion exchange resins are strong acid cation exchange materials containing sulfonic acid or phosphonic acid functionality. The strong base resins are those containing quaternary ammonium functional groups.

As will be more fully explained herein and illustrated by the examples, a strong acid resin in the hydrogen form is generally highly effective for removing antimony without further treatment of an acidic stream. However, when it is essential to remove all trace of antimony to meet federal or local regulations or the like, it may be necessary to treat the industrial stream with both a strong base and a strong acid resin, preferably in successive steps with the strong acid resin being used first. The same treatment may be applied to antimony contained in a more alkaline stream, except that the first treatment will involve passage through a bed of strong base resin. In either event, the acid resin must be in the hydrogen form and the strong base resin must be in the hydroxyl form.

Although the practice of our invention is not dependent upon any particular theory or belief expressed herein, and therefore we do not intend to be bound to same, our discovery appears to support a belief that antimony exists in solution, particularly in mixtures with organic materials, in some equilibrium concentrations of both anionic and cationic species. Antimony, which is known to be amphoteric, is readily converted in solution from one ionic form to another. A possible equilibrium equation is:

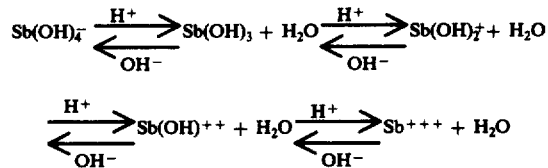

A strong acid resin may coordinate with the cationic antimony, and also donate protons which shift the equilibria, converting some anionic antimony into cationic antimony, which is then coordinated. The observed leakage of small amounts of antimony when acidic streams containing relatively large amounts are passed into contact with strong acid resins may be explained in terms of the equilibrium concentrations of anionic and cationic forms as a function of through-put. The strong base resins function in the reverse manner but perhaps not as efficiently. Therefore a two bed system composed of both strong acid and strong base resins offers a system capable of producing an effluent with zero leakage of antimony, a preferred method of operating our process.

The criticality of selecting a strong acid cation exchange resin in the hydrogen form for antimony removal from a crude acidic stream is established by the finding that neither a weak acid cation exchange resin in the hydrogen form nor a strong acid cation exchange resin in the sodium form are able to effectively remove the antimony. As mentioned above, it is believed that the antimony present in the crude solution requires the presence of strong acid sites in order to be converted into an exchangeable form, and hence the process involved may not be one of simple ion exchange.

Combined with the finding that antimony can be efficiently eluted from a strong acid resin with a caustic regenerant solution, the process of the invention offers a most desirable solution to the problem of recovering antimony from a crude acidic industrial stream, even one containing large amounts of organic matter. The usual strong acids or concentrated salt solutions normally used to regenerate strong acid resins are surprisingly inefficient for this purpose in accordance with the invention.

In many commercial processes, especially where leakage of minor amounts of antimony present no serious pollution problems, the use of a single bed of resin is preferable for economic reasons. A single bed can effectively remove antimony to a negligible level under proper conditions of operation. However, a second or "polishing" bed composed of a resin with opposite ionic functionality offers the alternative of maximum removal of antimony where a critical pollution problem exists. Where explained herein without qualification, the process employs a single bed, with the proviso that a second bed may be added for improved removal of antimony. The expressions "industrial stream" or "industrial effluent" as used herein are intended to relate interchangably to any process or waste stream wherein antimony is present either alone or in complex mixture with other dissolved substances, including organic materials.

By a preferred method according to the invention a crude acidic industrial stream containing both organic substances, e.g., diols, and antimony, is first filtered to remove suspended solids and then the filtrate is passed through a bed of sulfonic acid cation exchange resin in the hydrogen form whereby the antimony is removed. Preferably the resin used is in the macroreticular form offering somewhat better hydraulic properties than "gel" resins. After the ion exchange capacity of the cationic resin is exhausted by exchange of the hydrogen for antimony (or before), the antimony is eluted in very concentrated form by the use of a caustic regenerant and the resin is thereafter rinsed and converted back to the hydrogen form with a strong acid. Treatment of the spent regenerant with acid will precipitate the antimony as the oxide, which then can be removed by filtration. This precipitate, and the particulates originally removed from the crude industrial stream by filtration, can be processed to recover antimony in a useful form, e.g., by thermal means. The filtrate can be treated with caustic and recycled as regenerant, or recycled through the bed to remove any residual antimony, and discarded.

Antimony in any form, whether resulting from solubilization of organic or inorganic compounds can be removed from solution by one or more of the resins disclosed. However, complex streams containing substantial amounts of interfering ions tend to reduce the efficiency of the process and hence it may be desirable to selectively remove such other ions by other known techniques. Among the inorganic and organic compounds which may provide the source of antimony ion in industrial processes there are: antimony trioxide, antimony octanoate, alcoholate antimony, antimony tartrate, pyridylethylene antimony, morpholinoethylene antimony, antimonite magnesium, antimony trialkyl, antimony acetate, antimony chloride, antimony fluoride, antimony oxalate, antimony thiocarboxylate ethyl antimonite, antimony citrate, antimony glycerophosphate, and the like. The antimony compound may be desirably present in the stream (e.g., as catalyst) or be an undesirable contaminant resulting from an industrial process (e.g., the treatment of ore).

The process is applicable to removal of the minor amounts of antimony from any industrial stream or effluent containing antimony to the limit of solubility (about 500 ppm in an aqueous acidic stream). However, it should be borne in mind that concentration of the ionic species to be exchanged can have an effect upon bed size, throughput and the like.

The industrial stream containing the antimony may either be aqueous or non-aqueous. Preferably there should be no other cations present to interfere with the antimony exchange even though the resins of the invention may, under some circumstances, be selective for antimony in a complex mixture.

The process of this invention utilizes any of the well known strong acid and strong base ion exchange resins of the prior art, in the ionic forms disclosed herein and having either the so-called "gel" or "macroreticular" structures. In general, similar types of monomeric materials are used in preparing the macroreticular, and gel type resins, while the preparation process is varied to impart different characteristics, especially different porosity, to the different types of resins. In general, the backbone of these resins will be a crosslinked copolymer of (1) a polyunsaturated monomer, containing a plurality of non-conjugated $CH_2 = C <$ groups, which acts as a crosslinking agent and (2) and a monoethylenically unsaturated monomer, either aromatic or aliphatic. If desired, the polymer can comprise essentially all of (1).

Suitable polyunsaturated crosslinking agents include divinylbenzene, divinylpyridine, divinyltoluenes, divinylnaphthalenes, diallyl phthalate, ethylene glycol diacrylate, ethylene glycol dimethacrylate, trimethylolpropane trimethacrylate, neopentyl glycol dimethacrylate, bis-phenol A dimethacrylate, pentaerythritol tetra- and trimethacrylates, divinylxylene, divinylethylbenzene, divinylsulfone, divinylketone, divinylsulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitate, triallyl citrate, triallyl phosphate, N,N'-methylenediacrylamide, N,N'-methylene dimethacrylamide, N,N'-ethylenediacrylamide, trivinylbenzene, trivinylnaphthalene, polyvinylanthracenes and the polyallyl and polyvinyl ethers of glycol, glycerol, pentaerythritol, resorcinol and of the monothio or dithio derivatives of glycols.

Preferred crosslinking monomers include polyvinyl aromatic hydrocarbons, such as divinylbenzene and trivinylbenzene, glycol dimethacrylates and polymethacrylates, such as ethylene glycol dimethacrylate, trimethylolpropane trimethacrylate, and polyvinyl ethers of polyhydric alcohols, such as divinoxyethane and trivinoxypropane. The amount of crosslinking agent or monomer can be varied widely. In the case of anion-exchange resins the total utilizable capacity of the final resin as an anion-exchange resin generally decreases with an increase in the amount of crosslinking agent, and an amount of about $\frac{1}{2}$% to about 30%, and preferably about 3 to 10%, on a weight basis is usually adequate. However, for other purposes and for cation exchange resins the crosslinking level can be significantly higher, i.e., up to about 50% by weight or even higher based on the total weight of the monomers.

Suitable monoethylenically unsaturated monomers include esters of acrylic acid, such as methyl acrylate, ethyl acrylate, propyl acrylate, isopropyl acrylate, butyl acrylate, tertbutyl acrylate, ethylhexyl acrylate, cyclohexyl acrylate, isobornyl acrylate, benzyl acrylate, phenyl acrylate, alkylphenyl acrylate, ethoxymethyl acrylate, ethoxyethyl acrylate, ethoxypropyl acrylate, propoxymethyl acrylate, propoxyethyl acrylate, propoxyethyl acrylate, propoxypropyl acrylate, ethoxyphenyl acrylate, ethoxybenzyl acrylate, ethoxycyclohexyl acrylate, the corresponding esters of methacrylic acid, styrene, o-, m- and p-methyl styrenes, and o-, m-, and p-ethyl styrenes, vinyl naphthalene, vinyl toluene and dimethyl itaconate. A class of monomers of particular interest consists of vinyl aromatic monomers such as styrene and the esters of acrylic and methacrylic acid with a $C_1$-$C_{10}$ aliphatic alcohol.

The polymerization reaction is generally carried out in the presence of a catalyst. Suitable catalysts which provide free radicals to function as reaction initiators include benzoyl peroxide, t-butyl hydroperoxide, lauroyl peroxide, cumene hydroperoxide, tetralin peroxide, acetyl peroxide, caproyl peroxide, t-butyl diperphthalate, methyl ethyl ketone peroxide.

Another suitable class of free-radical generating compounds which can be used as catalysts are the azo catalysts, including for example, azodiisobutyronitrile, azodiisobutyramide, azobis($\alpha,\alpha$-dimethylvaleronitrile), azobis($\alpha$-methyl-butyronitrile) dimethyl, diethyl, or dibutyl azobis(methyl-valerate). These and other similar azo compounds, which serve as free radical initiators, contain an —N=N— group attached to aliphatic carbon atoms, at least one of which is tertiary. An amount of 0.01% to 2% of the weight of monomer or monomers is usually sufficient.

In making a gel copolymer and resin, a wide variety of polymerization conditions and processes well known in the art can be used. However, the preferred method is suspension polymerization in a liquid, such as water, which is not a solvent for the monomeric material. This method produces the polymer directly in the form of small spheroids or beads, the size of which can be regulated and controlled. By adjustments in the composition of the suspending medium and in the rate of agitation during polymerization, the suspension polymerization process can be made to produce spheroids or beads of a wide range of effective particle sizes.

In preparing a macroreticular copolymer and resin, the polymerization reaction is carried out in the presence of a precipitant which is a liquid (a) which acts as a solvent for the monomer mixture and is chemically inert under the polymerization conditions and (b) which is present in such amount and which exerts so little solvating action on the product cross-linked copolymer that phase separation of the product copolymer takes place as evidenced by the fact that the product copolymer is no more than semi-transparent and is preferably opaque when associated with a fluid having a different refractive index.

The determination of the most effective precipitant and the amounts required for the formation of a particular copolymer may vary from case to case because of the numerous factors involved. However, although there is no "universal" or single class of precipitants applicable to all cases, it is not too difficult to determine which precipitants will be effective in a given situation. The requirements of solubility with the monomer mixture and low solvating action on the product copolymer can be tested empirically and the solubilities of many monomers and copolymers are well known from publications and textbooks. A swelling type solvent can be used, however, provided that the crosslinker level is sufficiently high.

As a further guide in the selection of a suitable precipitant, reference may be made to scientific literature, for instance, as discussed in Hildebrand and Scott, Solubility of Non-Electrolytes, 3d., N.Y., 1950. In general, it may be stated that sufficiently wide differences in the solubility parameters of copolymer and solvent, respectively, must exist for the precipitant to be effective and that, once an effective precipitant has been located, the behavior of many other liquids can be predicted from the relative position of the reference polymer and precipitant in published tables, within the accuracy of such published information. Furthermore, if the solubility parameter of a given polymer occupies an intermediate position in these tables, solvents with both higher or lower parameters may become effective.

Many polymerization methods can be used in preparing the macroreticular resins. The preferred method, however, is suspension polymerization. In this case, an additional factor must be considered, namely, the solubility, i.e., miscibility of the precipitant in the suspending medium. Since suspension polymerization of most ethylenically unsaturated monomers is generally conducted in aqueous media, most frequently it is the water-solubility of the precipitant which must be considered. While precipitants with water-solubilities as high as 20 grams per 100 grams of water can be employed, a low water-solubility is preferred because of handling ease, ease of recovery, and processing economies. As is well known, however, it is possible to decrease the water-solubilities of compounds by adding salts to the aqueous phase and this method also may be employed to decrease the water-solubilities of a precipitant liquid. The general position is that, when suspension polymerization is used, the precipitant must be either immiscible or only partially miscible with the suspending medium.

Other suitable methods for preparation of the macroreticular resins are disclosed in U.S. Pat. Nos. 3,275,548 and 3,357,158.

The polymers and copolymers produced by the aforesaid methods are functionalized to produce ion exchange materials by any of the known methods of the art. As an alternative method of preparation the ion exchange resins may be produced from monomers containing reactive chlorine atoms so as to have a wider range in the degree of crosslinking (see e.g., U.S. Pat. Nos. 2,992,544 and 3,843,566).

Regeneration of the resins after they are loaded with antimony is accomplished using strong bases and acids. Suitable strong bases include alkali metal and ammonium hydroxides, preferably sodium and potassium hydroxide. Suitable acids are the inorganic strong mineral acids, particularly sulfuric, hydrochloric and and nitric acids. When regenerating the strong acid cation exchange resins it is necessary to first elute with a strong base, such as NaOH followed by treatment with a strong acid, such as $H_2SO_4$, to return the resin to the hydrogen form.

The following specific examples will further illustrate the invention but are not intended to limit in any way the broader aspects of the invention disclosed elsewhere herein. Unless otherwise indicated, all parts herein are by weight.

EXAMPLE 1

A. Removal of Antimony from Crude Ethylene Glycol

Antimony was removed from a crude ethylene glycol stream by passing a sample of the stream through a fixed bed of resin. The glycol sample was first suction filtered to remove suspended solids. The resin bed consisted of 20 cm³ of a styrene/divinylbenzene sulfonic acid cation exchange resin (a Rohm and Haas resin identified by the Trademark Amberlite 200) in the acid form in a 1 cm diameter burette column. The glycol sample was treated at approximately 10 bed volumes/hour using gravity flow. The initial concentration of antimony in the crude glycol stream was 178 ppm. All antimony analyses were done by atomic absorption spectroscopy. The results for the first cycle are given in Table I.

Table I

| Removal of Antimony from Crude Ethylene Glycol with Amberlite 200 | | |
|---|---|---|
| Number of bed-volumes through | Average Sb leakage (ppm) | Cumulative % Reduction in Sb |
| 0–150 | 15 | 91.6 |
| 150–190 | 30 | 89.8 |
| 190–235 | 60 | 85.3 |

The resin was loaded with a total of 5.66 mmoles of antimony.

B. Regeneration of Antimony-Loaded Resin

The resin used above was then regenerated using 10% NaOH after 1 ml. had been removed from the top of the bed. The regeneration flow rate was 4 bed volumes/hour for 10 bed volumes. Each bed volume was analyzed for antimony. The initial amount of antimony on the resin was 4.83 mmoles. The results are presented in Table II.

Table II

| Regeneration of Loaded Amberlite 200 using NaOH | | | |
|---|---|---|---|
| Bed Volume | Sb (mmoles) | Cumulative Sb (mmoles) | Cumulative % of Recovery |
| 1 | 2.140 | 2.140 | 44.3 |
| 2 | 1.940 | 4.080 | 84.5 |
| 3 | 0.200 | 4.280 | 88.6 |
| 4 | 0.010 | 4.290 | 88.8 |
| 5 | 0.008 | 4.298 | 89.0 |
| 7 | 0.047 | 4.345 | 90.0 |
| 8 | 0.033 | 4.378 | 90.6 |
| 9 | 0.030 | 4.408 | 91.3 |
| 10 | 0.029 | 4.437 | 91.9 |

These results show that the bulk of the loaded antimony can be removed with 2 – 3 bed volumes of caustic.

EXAMPLE 2

Additional Loading Experiments

Additional loading experiments were run using 19 ml beds of a methacrylic acid/divinylbenzene weakly acidic cation exchange resin (a Rohm and Haas resin identified by the trademark Amberlite IRC-50) in the hydrogen form, and a styrene/DVB strong acid cation exchange resin, Amberlite IR-120, in the sodium form. The results are given in Table III and show that neither of these resins is effective to a practical degree in removing antimony from a crude glycol stream similar to that treated in Example I, but containing 159 ppm Sb.

Table III

| | Loading Experiments | |
|---|---|---|
| | IRC-50 ($H^+$ form) | Amberlite IR-120 ($Na^+$ form) |
| Influent — Sb (ppm) | 159 | 159 |
| Bed Volumes | Sb in effluent (ppm) | |
| 0–10 | 103 | 146 |
| 10–20 | 135 | 155 |
| 20–30 | 148 | 156 |
| 30–40 | 135 | 162 |
| 40–50 | 160 | — |
| 50–60 | 170 | — |

EXAMPLE 3

Additional Regeneration Experiments

Regeneration studies were conducted on resin beds consisting of 10 cm³ of batch loaded Amberlite 200 in the antimony form. The results are given in Table IV. These results indicate that only strong bases are efficient regenerants, the most efficient being 10% NaOH.

Table IV

| Summary of Regeneration Results | |
|---|---|
| Regenerant | % Antimony Recovered in 10 bed volumes |
| 4% $H_2SO_4$ | 2.4 |
| 4% HCl | 17.5 |
| 4% KOH | 38.0 |
| 4% NaOH | 43.5 |
| 10% NaOH | 76.5 |

In addition, both 4% NaCl and 25% NaCl were tried (See Example 6 below). Neither solution eluted antimony from the resin bed. In fact, the use of 25% NaCl caused severe precipitation in the bed, stopping the flow and precluding the use of concentrated NaCl solutions as regenerants.

EXAMPLE 4

Relative Efficiencies

Three Rohm and Haas cation-exchange resins were batch loaded in order to determine their relative efficiencies of uptake and to provide samples for regeneration studies. These were IRC-50, a macroreticular carboxylic acid cation-exchanger, and Amberlite IR-120 and Amberlite 200, which are, respectively, gel and macroreticular sulfonic acid cation-exchangers. The basic procedure was the same in all cases. A weighed amount of wet resin in the $H^+$ form was mixed with a volume of crude ethylene glycol of known antimony content and stirred overnight. The resin was then filtered off and the glycol analyzed for antimony. From the difference in concentrations, the amounts of antimony loaded on the resins were calculated. These results are given in Table V.

Table V

| | IRC-50 | IRC-50 | Amberlite | | |
|---|---|---|---|---|---|
| | | | IR-120 | 200 | 200 |
| Wt. (gm) | 2.0 | 13.8 | 2.0 | 2.0 | 50.0 |
| Vol. (ml) | 2.89 | 20.0 | 2.35 | 2.50 | 40.0 |
| Wt. CEG* (gm) | 112 | 5012 | 112 | 112 | 1887 |
| Sb (ppm) | | | | | |

Table V-continued

|  | IRC-50 | IRC-50 | Amberlite IR-120 | Amberlite 200 | Amberlite 200 |
|---|---|---|---|---|---|
| Initial Sb (ppm) | 285 | 165 | 285 | 285 | 300 |
| Final | 180 | 150 | 12 | 12 | 70 |
| Loading Level mmoles/ml | .033 | .031 | .110 | .100 | .075 |

*CEG = Crude ethylene glycol

EXAMPLE 5

Saturation Capacities

Saturation capacities were calculated for Amberlite IR-120 and Amberlite 200 from antimony and sulfur analyses of resin samples from the top one ml. of 20 ml. beds after 235 bed-volumes of filtered crude ethylene glycol had been passed through. It was assumed that the top milliliter of the bed would very closely approximate the true saturation capacity of the resin. The calculated values are shown below:

| Resin | Saturation Capacity mmoles/ml |
|---|---|
| Amberlite IR-120 | 0.87 |
| Amberlite 200 | 0.83 |

It is of interest to note that whereas the total theoretical exchange capacities of both resins is 1.9 meq/ml, their capacities for antimony are very close to just one-half as great. This may indicate that in the loaded resin, each antimony atom (or complex) coordinates with two sulfonic acid groups.

EXAMPLE 6

Several experiments were performed using the column loaded Amberlite IR-120. In the first of these, a solution of 4% NaCl was passed through the resin under regeneration conditions. The purpose of this experiment was two-fold. One, to determine if 4% NaCl can function as a regenerant, and two, if no antimony leakage occurred, to use the sodium to displace the remaining protons. The generated acid could then be titrated with base as a method of determining the coordination of the antimony in the resin bed.

The attempt to use 4% NaCl as a regenerant was unsuccessful. Essentially no antimony was found in either the eluant or the rinses. On the other hand, the use of the NaCl as a means of determining coordination was successful. The details of this experiment are as follows: the resin bed was first rinsed with 100 ml of deionized water which had been adjusted to pH = 7.0. This was done in order to rinse the residual glycol from the bed. Then 200 ml of 4% NaCl, also adjusted to pH = 7.0, was passed through the bed and collected batchwise. Finally a 10 ml portion of deionized water at pH = 7.0 was passed through and collected with the NaCl eluant. The pH of this eluant solution was 0.91. It was then titrated with 1.0N NaOH back to a pH of 7.0. From the amount of NaOH used, the amount of generated acid could be determined.

The amount of 1.0N NaOH used was 27.0 ml, which indicated that 27.0 meq of HCl had been generated. The total theoretical capacity of Amberlite IR120 was 1.9 meq/ml × 19 ml = 36.1 meq. The amount of loaded antimony was 5.60 meq loaded − 0.87 meq (from top ml of bed) = 4.73 meq. Therefore, 36.1 − 4.73 = 31.4 meq of available sites unused, but only 27.0 meq of HCl was generated. Since 31.4 − 27.0 = 4.40 meq, this is a strong indication that the antimony species is coordinated with two sulfonic acid groups. This is further substantiated by the calculations of the saturation capacity, where the ratio of antimony to sulfur was also found to be two to one.

Since 4% NaCl was not a successful regenerant, a second experiment was done with 25% NaCl to determine if this concentration could regenerate the resin. The procedure used was the same as that described previously. The results of this experiment were quite interesting. The brine solution obviously did displace the antimony from the resin; however, it also caused severe precipitation of an insoluble white material not only in the bed, but also in the beads. Antimony analysis of the 25% NaCl solution after treatment of the bed accounted for only 0.139 mmoles of antimony, which is 2.9% of the total antimony loaded on the resin. The resin was then treated with 10% NaOH in order to re-dissolve the precipitate and remove the antimony from the resin. After 16 bed-volumes, 86.1% of the total loaded antimony was removed and no signs of precipitate were present.

EXAMPLE 7

It appears likely that antimony present in an organic stream is not in a simple cationic form, but rather in some form which requires strong acid sites in order to be converted into an exchangeable species. In fact, because of the amphoteric nature of antimony, it could be present as an anionic species, which, in the presence of strong acid sites, is converted into cationic forms. In order to test this hypothesis, a crude ethylene glycol stream was passed through a 20 cm³ bed of Amberlite XE-279, an acrylic, macroreticular, strong base anion-exchange resin in the OH⁻ form. The results of this experiment are shown below:

| Bed Volumes | Amberlite XE-279 156 (Influent Sb- ppm) Effluent (ppm) |
|---|---|
| 0–10 | 3.2 |
| 10–20 | 5.6 |
| 20–30 | 8.4 |
| 30–40 | 15 |
| 40–50 | 27 |
| 50–60 | 44 |
| 60–70 | 76 |
| 70–80 | 123 |
| 80–90 | 281 |
| 90–100 | 352 |
| 100–110 | 352 |
| 110–120 | 333 |

It can be seen that a strong base resin will indeed pick up antimony from a crude ethylene glycol stream. However, although initial leakage levels are lower for XE-279 as compared to Amberlite 200 or IR-120, the leakage breaks sharply. The fact that the resin can reduce the antimony levels at all, however, indicates that the antimony must either be in an anionic form or in one convertible to an anionic form.

EXAMPLE 8

A multibed test was conducted to prove the suitability of using both strong acid and strong base resins, in their H⁺ and OH⁻ forms, respectively, to reduce antimony leakage to zero or near zero. Crude glycol was first passed through a 20 cm³ bed of Amberlite 200 and then through a 20 cm³ bed of XE-279. The results of this experiment are shown below:

| Bed Volumes | Influent - 156 ppm Sb Amberlite 200 (H+) | XE-279 (OH−) |
|---|---|---|
| 0–10 | 18 | <2 |
| 10–20 | 23 | <2 |
| 20–30 | 30 | <2 |
| 30–40 | 40 | <2 |
| 40–50 | 47 | 5 |
| 50–60 | 47 | 11 |
| 60–70 | 51 | 31 |
| 70–80 | 54 | 76 |
| 80–90 | 61 | — |

For the first 40 bed volumes through (considering one bed-volume = 20 cm³), the antimony leakage was less than 2 ppm. (Note: the leakage may very well have been zero — the analyses could not be determined more precisely due to interferences from the glycol.) The leakage from the XE-279 column then breaks sharply. These results are not inconsistent with the idea of an equilibrium mixture of anionic and cationic antimony species. The fact that the XE-279 column begins to regenerate after a certain volume of glycol has been treated may be related to the pH of the effluent, which becomes more acidic.

We claim:

1. A process for removing antimony from an industrial stream containing a minor amount of solubilized antimony which comprises passing said industrial stream into contact with at least one ion exchange resin selected from strong acid cation exchange resin in the hydrogen form to remove antimony present as, or convertible to, the cationic form and strong base anion exchange resin in the hydroxyl form to remove antimony present as, or convertible to, the anionic form.

2. The process of claim 1 wherein the antimony is recovered by elution from the ion exchange resin, precipitation and filtration of the eluate.

3. A process for removing antimony from an acidic industrial stream containing the same in minor concentrations which comprises passing said industrial stream through a bed of strong acid cation exchange resin in the hydrogen form until the ion exchange capacity of the resin is largely exhausted by exchange with antimony and thereafter eluting the antimony from the resin with a strong base.

4. The process of claim 3 wherein the industrial stream is an aqueous organic mixture.

5. The process of claim 3 wherein the strong acid cation exchange resin is a sulfonic acid resin in the hydrogen form.

6. The process of claim 3 wherein the strong base is 10% NaOH.

7. The process of claim 3 wherein the effluent from the bed of strong acid cation exchange resin is passed through a second bed of resin consisting of a strong base anion exchange resin in the hydroxyl form.

8. The process of claim 3 wherein the industrial stream is a reaction effluent from the manufacture of poly(ethylene terephthalate) containing antimony and ethylene glycol.

9. The process of claim 3 wherein the antimony eluted from the resin is precipitated from the eluate by a strong acid and recovered as antimony oxide by filtration.

10. A process for removing antimony from an industrial stream containing the same in minor concentrations which comprises passing said industrial stream through a bed of strong base anion exchange resin in the hydroxyl form until the ion exchange capacity of the resin is largely exhausted by exchange with antimony.

11. A process for recovering antimony from an industrial stream containing a minor amount of solubilized antimony which comprises contacting such industrial stream in series with both strong acid and strong base ion exchange resins in their hydrogen and hydroxyl forms, respectively, to remove essentially all of the antimony from the stream and thereafter eluting the antimony from the strong acid and strong base resins, precipitating the antimony with acid, and recovering the antimony trioxide by filtration.

* * * * *